United States Patent [19]

Smith

[11] 4,378,919

[45] Apr. 5, 1983

[54] APPARATUS FOR CONTROLLING ORIENTATION OF A SUSPENDED LOAD

[75] Inventor: Harlan B. Smith, Canby, Oreg.

[73] Assignee: Erickson Air Crane Co., Hillsboro, Oreg.

[21] Appl. No.: 817,058

[22] Filed: Jul. 19, 1977

[51] Int. Cl.³ .............................................. B64D 9/00
[52] U.S. Cl. .............................. 244/118.1; 244/137 R; 294/81 SF
[58] Field of Search .................. 244/137 R, 136, 127, 244/118 R, 118.1; 294/81 R, 81 SF

[56] References Cited

U.S. PATENT DOCUMENTS

| | | | |
|---|---|---|---|
| 3,036,797 | 5/1962 | Agusta | 244/137 R |
| 3,044,818 | 7/1962 | Tobey | 244/118 R X |
| 3,554,468 | 1/1971 | McVicar | 244/137 R |

Primary Examiner—Galen L. Barefoot
Attorney, Agent, or Firm—Kolisch, Hartwell & Dickinson

[57] ABSTRACT

Apparatus for use in an aircraft, such as a helicopter, for controlling rotation of a load suspended from a cable and for permitting the cable to swing relative to the helicopter. A frame includes a first or upper assembly which is mounted on the helicopter for pivotal movement about a first pivot axis. The frame also includes a second or lower assembly connected to the upper assembly which is pivotal about a second pivot axis extending transversely to the first pivot axis. A spreader bar is suspended within the frame and is isolated during helicopter pitch and roll. Helicopter yaw imparts positioning of the spreader bar relative to a vertical axis so that the load may be selectively oriented.

7 Claims, 7 Drawing Figures

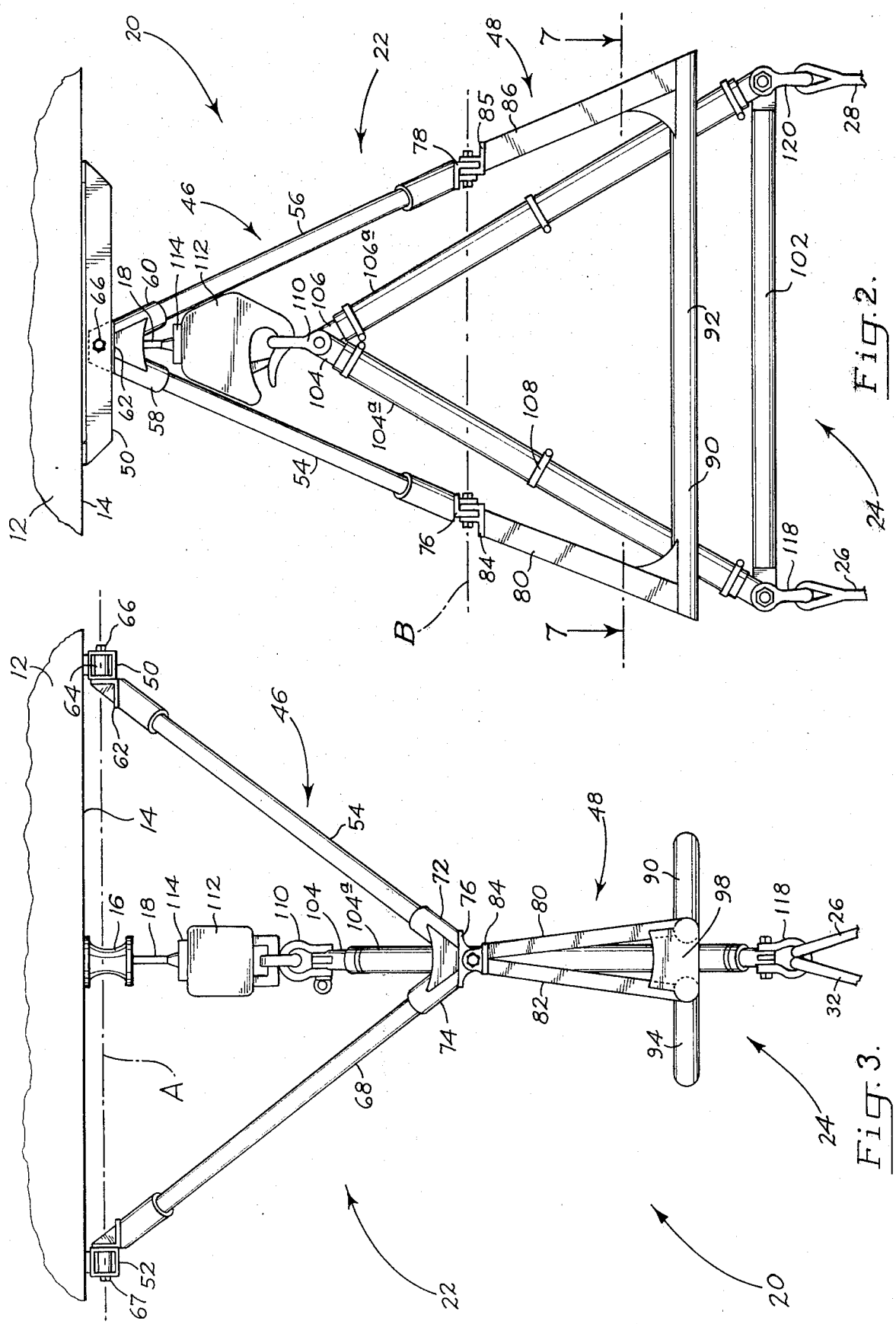

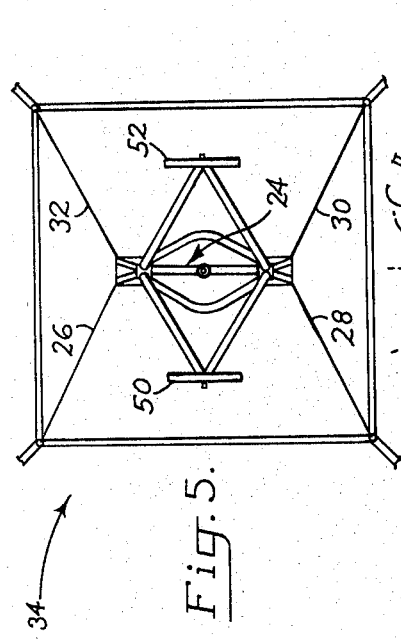
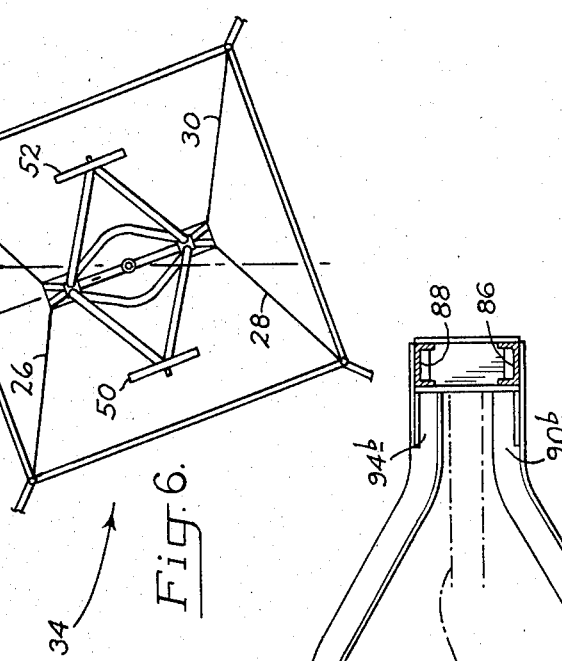
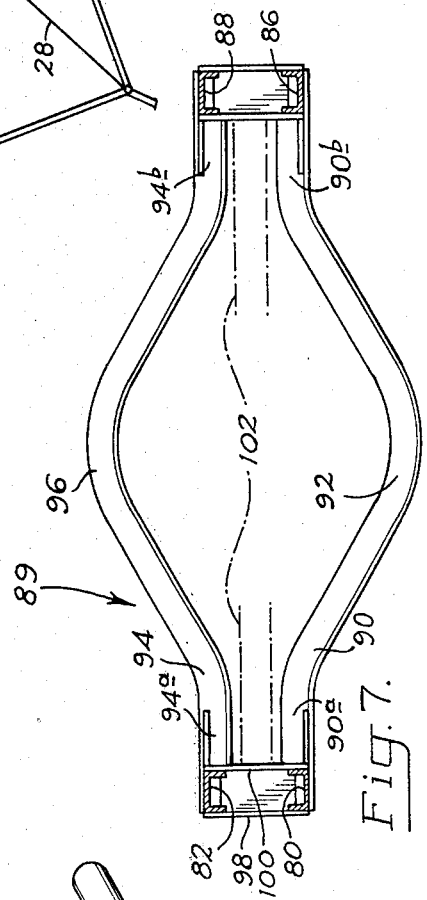
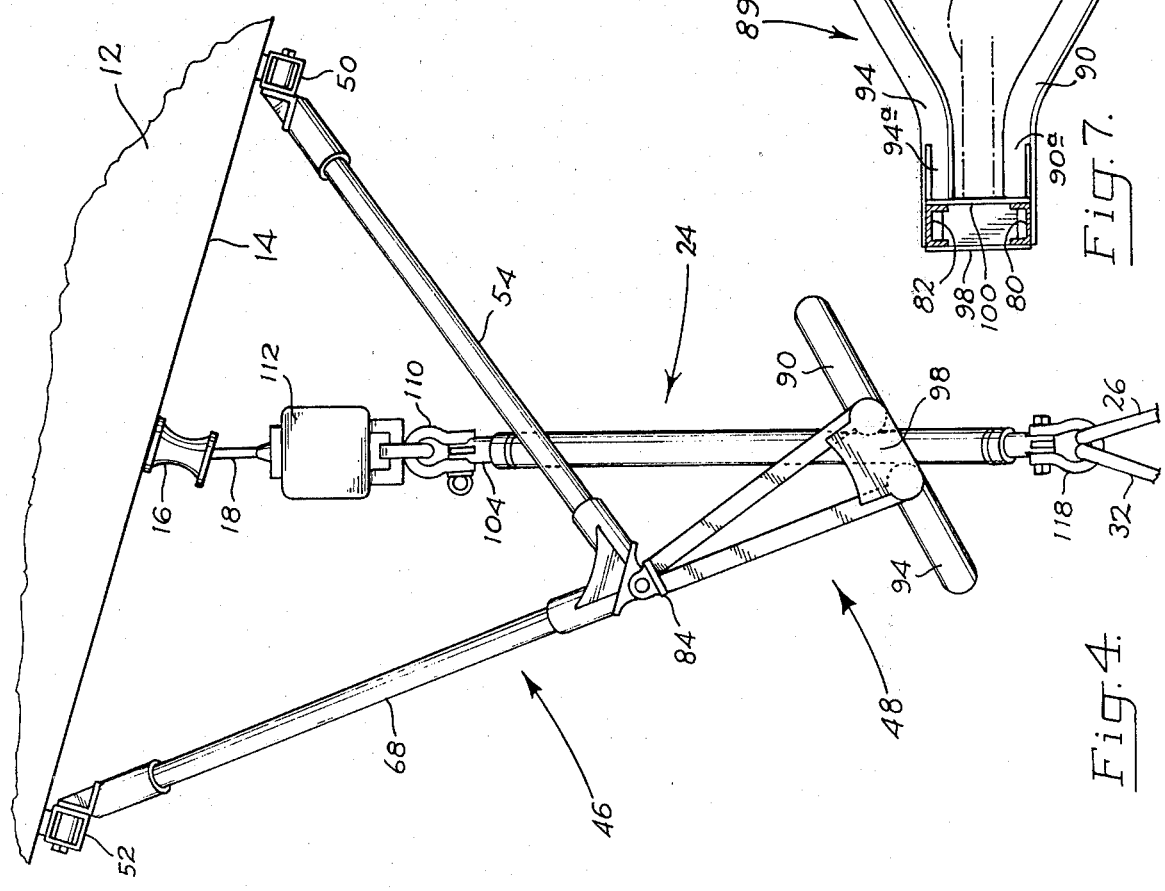

APPARATUS FOR CONTROLLING ORIENTATION OF A SUSPENDED LOAD

BACKGROUND AND SUMMARY OF THE INVENTION

The present invention relates to aircraft which transport a suspended load, and also hover while lowering the load, and more particularly to an apparatus for use on an aircraft for accurately controlling orientation of a load.

Helicopters have been found particularly useful in transporting suspended, heavy loads and placing such loads in desired locations. Generally, such heavy lift capacity helicopters are provided with a lift cable which extends from beneath the belly portion of the fuselage for connection to a load. Helicopters have been found particularly advantageous in the erection of bulky and heavy steel transmission towers.

Steel transmission towers are generally constructed of plural, interconnected sections such as an upper section and a lower section. Heavy lift capacity helicopters such as the Sikorsky Sky Crane may be used to suspend and transport the sections. Placement of a lower section is not unduly burdensome because linemen can be positioned on the ground for guiding a suspended lower section into place on a mounting pad. Guy lines can be used to facilitate placement. However, a much greater problem is presented during the lowering of the upper section onto the lower section.

For instance, with the helicopter hovering above the lower section, the suspended upper section will tend to swing and rotate due to changes in wind conditions and also because of the swirling air mass caused by the helicopter's rotating blades. Consequently, it has been found extremely difficult to lower the upper section onto the lower section so that the support legs of the section become aligned. Linemen can be positioned at the top of the lower section for guiding the upper section as it is lowered, but an extremely dangerous situation results because the linemen have no readily available escape route from a twisting and rotating suspended upper section.

Placement of the upper section onto the lower section is effectuated primarily by yawing the helicopter. Thus, it is extremely desirable to have the upper section load respond immediately to helicopter yaw, which is controlled by the pilot. However, it is undesirable to have the load rotate independently of pilot control.

Additionally, it is desirable to permit the upper section to swing independently of helicopter pitch and roll. The helicopter may have to compensate for changes in wind conditions, etc., and such is accomplished by pitching and/or rolling the craft.

Various proposals have been advanced to facilitate the lowering of a suspended upper section. These proposals are directed to maintaining so-called yaw control or control of the suspended load during yaw of the helicopter. However, such proposals have generally utilized a rigid cage assembly suspended beneath the helicopter's fuselage for contacting a spreader bar assembly. Because the cage assembly is rigidly mounted, any pitch or roll of the helicopter will immediately transfer motion to the upper section and undesirably affect its orientation.

Additionally, a rigid cage assembly does not allow the load from the upper section to be directly transferred to the center of lift of the helicopter during forward travel. For instance, as the helicopter gains air speed, the upper section will tend to swing toward the aft end of the helicopter. Because the rigid cage assembly contacts a spreader bar, the load will not be transferred up through the center of lift of the helicopter but rather will be transferred to a position forwardly of the center of lift. This causes the helicopter to assume a pitched down attitude which greatly limits air speed. With a rigid cage assembly, Sky Cranes have been limited to flight speeds of 40 knots or less.

Another problem present in prior art rigid cage assemblies resides in the fact that a helicopter must pitch and roll during hovering in order to compensate for wind changes in the atmosphere as well as swirling wind caused by the helicopter's blades. Rigid case assemblies do not permit the upper section to be suspended in a relatively isolated manner during pitch and roll. In those cage assemblies permitting some degree of freedom in pitch, roll freedom is not necessarily provided.

Accordingly, it is a general object of the present invention to provide a control apparatus for mounting on the fuselage of a helicopter which will directly transmit yaw movement to a speader bar for selectively orienting a suspended load. The apparatus is pivotally mounted on the fuselage in a manner so that pitch and roll movement of the helicopter will not effect orientation of the load. Precise control in yaw is provided and the load will not rotate independently of pilot control.

Another object of the present invention is to provide a control apparatus in which an upper assembly is pivotally mounted to the fuselage about a first pivot axis. A lower assembly is pivotally connected to the upper assembly about a second pivot axis extending transversely to the first pivot axis. A speader bar assembly generally occupying a vertical plane is suspended between the upper and lower assemblies for contact with the lower assembly. Freedom in pitch and roll is ensured while control in yaw is maintained by the lower assembly.

Another object of the present invention is to provide a control apparatus for transmitting helicopter yaw movements to the speader bar, but which permits the line of action of a suspended load to be transmitted directly to the center of lift of the helicopter during forward flight.

These and other objects and advantages of the present invention will be more readily apparent from a consideration of the following drawings and a detailed description of the preferred embodiment.

DETAILED DESCRIPTION OF THE DRAWINGS

FIG. 2 is a side elevation view of the control apparatus including a spreader bar;

FIG. 3 is a front elevation view of the control apparatus looking aft;

FIG. 4 is a view similar to FIG. 3 illustrating orientation of the control apparatus and speader bar during roll of the helicopter;

FIG. 5 is a top plan view of the control apparatus with the helicopter removed illustrating an initial positioning of the spreader bar and its attached lower section;

FIG. 6 is a top plan view similar to FIG. 5 illustrating positioning of the control apparatus and spreader bar with its attached load immediately after a yaw movement of approximately 20° by the helicopter; and FIG. 7 is a view taken along lines 7—7 of FIG. 2 and illustrates a "doughnut" or hoop-shaped portion of the control apparatus.

DETAILED DESCRIPTION OF THE PREFERRED EMBODIMENT

Figure 1:
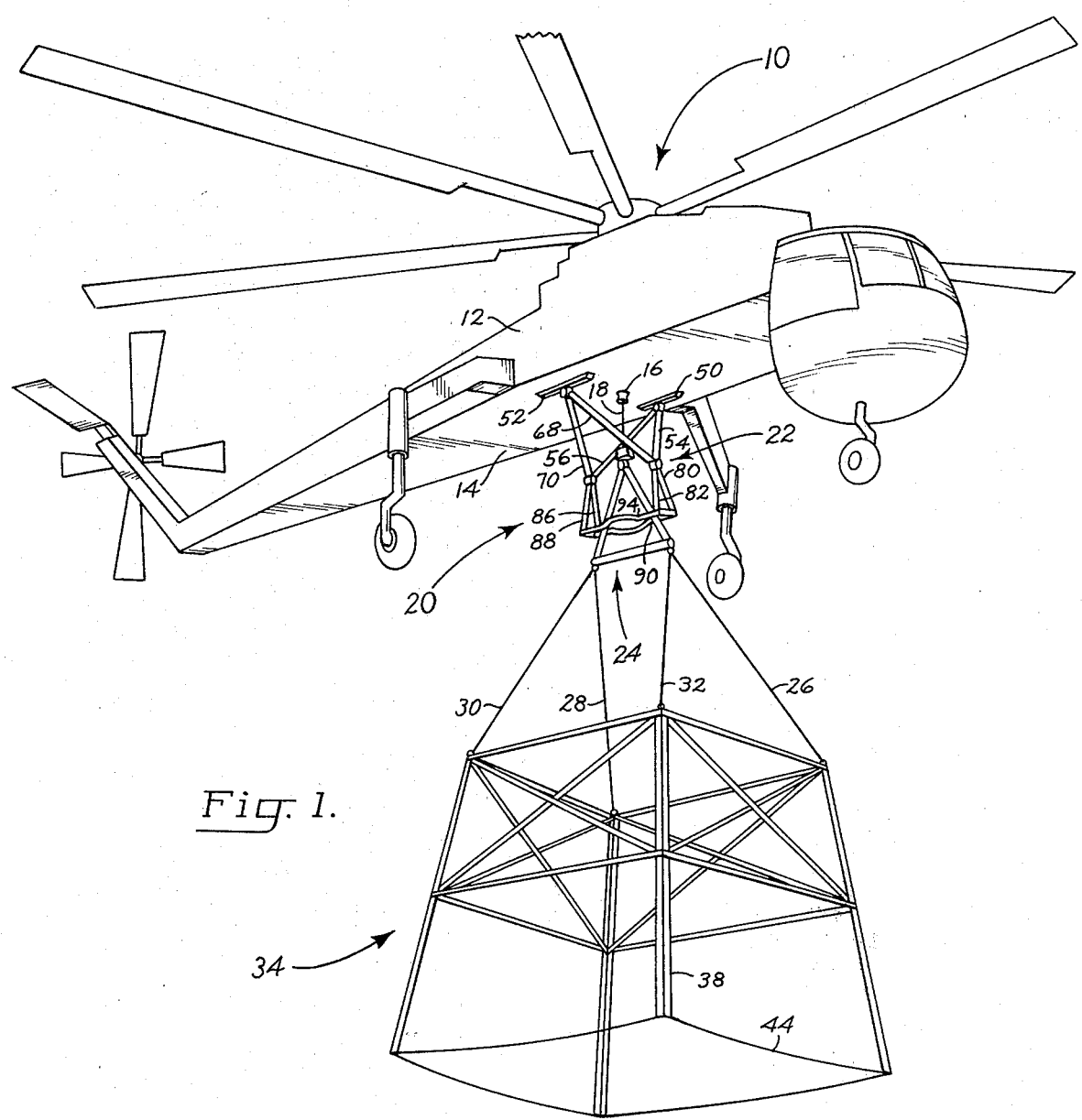
FIG. 1 is a perspective view of a heavy lift helicopter utilizing a control apparatus of the present invention in the placement of a suspended upper section of a transmission tower onto a lower section, portions of the lower section being cut away.
Figure 1:
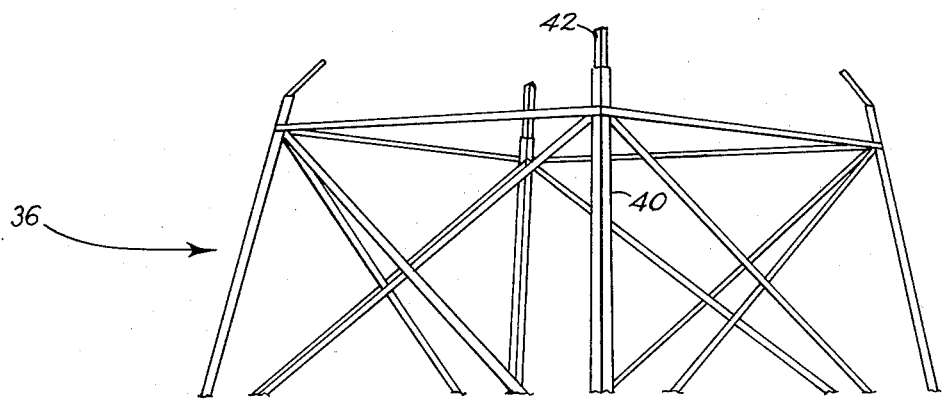

Referring initially to FIG. 1 of the drawings, there is indicated generally at 10 a large heavy lift helicopter such as a Sikorsky Sky Crane. Helicopter 10 includes a fuselage 12 having an elongate, flattened belly 14. A well is provided in the belly and includes a cable guide 16. A powered winch assembly (not shown) is mounted within the well for selectively extending and retracting a load-supporting lift cable 18. The cable extends downwardly from a so-called center of lift.

According to the principles of the present invention, a control apparatus, generally indicated at 20, includes frame means generally indicated at 22. A spreader bar means is generally indicated at 24. Extending downwardly from spreader bar means 24 are interconnecting means such as members or cables 26, 28, 30 and 32 which join spreader bar means 24 to an upper section of a transmission tower generally designated at 34. Cables 26, 28 and 30, 32 extend outwardly and downwardly from separate locations on spreader bar means 24 to spaced-apart connections on upper section 34. The cables define sides of a pair of triangles. A lower section, appropriately supported on the ground, is generally indicated at 36.

As can be seen from a consideration of FIG. 1, helicopter 10 has transported upper section 34 to a position somewhat above lower section 36. Helicopter 10 is maintained in a hovering position so that the power-driven winch assembly may be actuated to lower upper section 34 onto lower section 36. Specifically, each of the support legs of upper section 34 must be aligned with a corresponding support leg of lower section 36. For example, support leg 38 of upper section 34 must be aligned with support leg 40 of lower section 36 so that the legs may be bolted together. In order to facilitate guiding of upper section 34 onto lower section 36, so-called angle guides such as one shown at 42 are provided on the support legs of lower section 36. Perimeter positioning cables or lines such as shown at 44 extend between the support legs of upper section 34 and provide a contacting surface for the angle guides if corresponding legs are not initially aligned during lowering of upper section 34.

From the above, it can be seen that considerable problems may arise during lowering of upper section 34 onto lower section 36. As set forth previously, changes in wind conditions may require the helicopter pilot to pitch and roll helicopter 10 in order to compensate for such conditions. During pitching and rolling, it is desirable that upper section 34 be suspended in a manner isolated from the pitching and rolling movement. However, the pilot must utilize yaw movement of helicopter 10 in order to align the support legs of upper section 34 into approximate position with the support legs of lower section 36. This means that no rotation of upper section 34 can be permitted independent of pilot control. Thus, while it is desired to have an undisturbed suspended upper section during pitch and roll, yaw control must still be maintained.

By providing yaw control, the undesired rotation of upper section 34 can be prevented. To this end, control apparatus 20 of the present invention has been found to be particularly efficient. Explaining further, reference is now directed to FIGS. 2 and 3 of the drawings. As shown in FIG. 2, control apparatus 20 includes frame means 22 within which is at least partially disposed spreader bar means 24. Frame means 22 includes a first or upper assembly generally indicated at 46 and a second or lower assembly generally indicated at 48. Upper assembly 46 is mounted to fuselage 12 on belly 14 so it may freely pivot about an axis extending generally transversely to the longitudinal axis of helicopter 10. A pair of elongate box beams 50, 52 are appropriately secured to belly 14 on opposite sides of the well and extend generally parallel to the longitudinal axis of helicopter 10.

Extending from each box beam 50, 52 and inclined toward the longitudinal axis of the helicopter are a pair of pivotally mounted tubular strut members. For instance, considering FIG. 2 in more detail, it can be seen that strut members 54, 56 are mounted in sleeve members 58, 60 respectively. Sleeve members 58, 60 are secured to an angle member 62 which, in turn, is pivotally connected by means of a bushing 64 and a bolt 66 to an interior side of box beam 50. As illustrated, strut members 54, 56 are interconnected in sleeve members 58, 60 respectively so that one set of their ends are pivotally connected to the fuselage on the port side. The strut members define an angle between each other and are also inclined in a common triangular plane toward the longitudinal axis of helicopter 10.

Similarly, strut members 68, 70 on the starboard side of helicopter 10 are pivotally mounted to box beam 52 and are inclined inwardly in a common triangular plane toward the longitudinal axis of the helicopter. Upper assembly 46 may thereby freely pivot about a first pivot axis indicated at A. Strut members 54, 68 are connected together substantially in line with and fore of the longitudinal axis of cable 18 by means of sleeve members 72, 74. Sleeve members 72, 74 are rigidly secured to an angle member 76. Similarly, aft strut members 56, 70 are secured to an angle member 78. Each of angle members 76, 78 is provided with a bore and the bores are aligned along a common axis such as a second pivot axis indicated at B which extends generally parallel to the longitudinal axis of helicopter 10.

Considering now details of lower assembly 48, it is noted that FIG. 3 illustrates fore mounted channel strut members 80, 82 joined to an angle member 84. Angle member 84 is appropriately pivotally connected to angle member 76. Similarly, lower assembly 48 includes aft strut members 86, 88 (see FIGS. 1, 2) which are secured to an angle member 88 pivotally connected to angle member 78. It is to be noted that each pair of strut members 80, 82 and 86, 88 are joined at their upper ends to define an angle therebetween.

With reference also directed to FIG. 7 of the drawings, it can be seen that strut members 80, 86 are suitably connected to each other by a guide means generally indicated at 89. Guide means 89 includes an elongate tubular member 90 having a bent or hooped portion 92. Likewise, strut members 82, 88 are interconnected by means of a tubular member 94 also including a hooped portion 96. Suitable brackets 98, 100 are provided for joining strut members 80, 82 and tubular members 90, 94. Similar brackets are provided at the other end.

The front and rear portions of tubular members 90, 94 are provided with portions 90a, 94a having their opposed longitudinal axes substantially parallel. As a result, a certain predetermined spacing or dimension is provided between the inner surfacees of portions 90a, 94a. Similarly, parallel spaced portions 90b, 94b are provided at the other end. Thus, guide means 89 provides a guide or slot for receiving spreader bar means 24 and controlling rotation of the spreader bar means about a substantially vertical axis.

From the above description, it can be seen that upper assembly 46 is free to pivot about axis A extending through bolts 66, 67 which is generally transverse to the longitudinal axis of helicopter 10. Lower assembly 48 is pivotally connected to upper assembly 46 for pivotal movement about an axis extending generally parallel to the longitudinal axis of helicopter 10.

Returning to FIGS. 2 and 3, details of spreader bar means 24 will now be described. Spreader bar means 24 is formed as a triangle having a base member 102 and interconnected side members 104, 106. Each side member 104, 106 is provided with a resilient outer surface 104a, 106a respectively for cushioning impact with guide means 89. The resilient surfaces are secured to side members 104, 106 by means of appropriate clamping sleeves such as shown at 108. Side members 104, 106 are dimensioned with a thickness, including resilient covers 104a, 106a for free movement between portions 90a, 94a and 90b, 94b. However, the clearance on either side is contemplated to be relatively small, i.e., approximately ½ inch or so.

The upper ends of side members 104, 106 are joined at an apex and are connected to a clevis 110 which in turn is connected to an adjustable hook assembly 112. Hook assembly 112 is appropriately secured to a swivel connection 114 which, in turn, is connected to winch cable 18. Spreader bar means 24 also includes opposed clevises 118, 120 which are connected to cables 26, 32 and 28, 30, respectively.

From the above description, it can be seen that several distinct advantages result from the unique construction of load control apparatus 20 of the present invention. For instance, as shown in FIG. 4, helicopter 10 has assumed a roll toward its port side. However, spreader bar means 24 is maintained suspended in a substantially vertical plane and is isolated from the roll. Thus, a load, such as lower section 34, is undisturbed by roll of the helicopter. Lower assembly 48 moves with spreader bar 24 because of the close spacing existing between side members 104, 106 and portions 90a, 94a and 90b, 94b. Lower assembly 48 is readily pivoted about second pivot axis B extending substantially parallel to the longitudinal axis of the helicopter.

Likewise, it can be seen that if helicopter 10 were to assume either a pitched up or down attitude, upper assembly 46 would be undisturbed from its normal suspended position about first pivot axis A because of the relative pivoting of the helicopter. Thus, it can be seen that control apparatus 20 enables the load to be suspended substantially unaffected or isolated during helicopter pitch and roll.

However, a key feature of the present invention resides in the fact that any yaw movement of helicopter 10 will be transmitted to spreader bar means 24 and correspondingly to its suspended load. Rotation of the load can thereby be accurately controlled about a substantially vertical axis. This feature is clearly illustrated in FIGS. 5 and 6. FIG. 5 is a view with the helicopter not shown and illustrates lower section 34 being suspended from spreader bar means 24. Assuming that the top of FIGS. 5, 6 would correspond to the front end of a helicopter (if the helicopter were illustrated) it can be seen that FIG. 6 represents a yaw movement of approximately 20° to port about the longitudinal axis of the helicopter, indicated at C. Because spreader bar means 24 is mounted within tubular members 90, 94 any yaw movement of helicopter 10 will be directly transmitted to side members 104, 106 and correspondingly through triangular cables 26, 32 and 28, 30 to lower section 34.

Precise yaw control of lower section 34 is thereby ensured. Any degree of yaw movement of helicopter 10 will be immediately transmitted to spreader bar means 24 if it is suspended within tubular members 90, 94.

Considering FIG. 4 once again, it can be seen that even though the helicopter may be rolled to its port side, the helicopter could nonetheless be swung through any degree of yaw movement and spreader bar means 24 would be correspondingly yawed to rotate upper section 34. It is to also be noted that the precise yaw control of the present invention prevents undesired rotation of a suspended load during hovering. The control apparatus thereby serves as an anti-rotation device.

With the above description kept in mind, a return to FIG. 1 will enable an appreciation of the procedure in erecting a tower utilizing control apparatus 20 the present invention. Initially, upper section 34 is connected to spreader bar means 24 as shown in FIG. 1 and transported to an erection site. Spreader bar means 24 is suspended within tubular members 90, 94. The helicopter pilot descends to a position in which it is anticipated that corresponding support legs of upper section 34 may be aligned with support legs of lower section 36. If there is a sudden wind shift in velocity or direction, it may be necessary for helicopter 10 to be pitched or rolled in order to stabilize its hovering. However, control apparatus 20 of the present invention enables the load to be suspended substantially isolated during pitching and rolling. The pilot may, nonetheless, accurately rotate upper section 34 about a substantially vertical axis by yawing helicopter 10. Guide means 89 contacts and transmits rotation from the helicopter to spreader bar means 24 upon yawing. It is to be noted that control apparatus 20 also prevents undesired rotation of spreader bar means 24 and upper section 34.

After upper section 34 has been completely lowered, it may be that spreader bar means 24 and hook assembly 112 are positioned beneath guide means 89. The hooped portions in members 90, 94 enable hook assembly to freely pass thereby.

It is also to be noted that control apparatus 20 permits a heavy load to be suspended by means of winch cable 18 and spreader bar means 24 so that the load will be transmitted upwardly to the helicopter's center of lift during high speed flight. A load suspended from beneath a travelling helicopter will tend to swing toward the aft end of the helicopter. Because upper assembly 46 is pivotally connected to fuselage 12, the load from upper section 34 will be permitted to swing toward the helicopter's aft end. The load from upper section 34 will be directly transmitted to the center of lift (i.e., the location of the winch assembly) and not to frame means 22.

This is to be contrasted with the situation in which a rigid cage assembly is provided. In that case, the load contacts the rigid cage assembly and shifts the line of action of the load to a location forwardly of the center of lift. Consequently, the helicopter is subjected to a downward load component and it must be flown with a pitched down attitude. With the control apparatus of the present invention, speeds approximating 90 knots have been achieved while transporting loads, such as upper tower section, with weights of approximately 20,000 pounds because the line of action of the load is directed through the center of lift. The increase in speeds obtainable by use of the present invention is quite substantial in view of the former speeds obtainable with prior art rigid cage assemblies.

There are further, substantial advantages inherent in control apparatus 20. Yaw control can be precisely achieved within two degrees so that loads can be accurately positioned.

The construction of frame means 22, including inclined triangular planes defined by strut member pairs 54, 56 and 68, 70, provides sufficient structural strength so that twisting of the frame means will not occur. Likewise, the triangular construction will readily transmit rotation to the spreader bar and suspended load when the helicopter yaws. The triangular construction enables lighter weight structural members to be used.

Advantageously, it has been found that frame means 22 can be constructed as described above with a weight of approximately 350-400 pounds. Prior art rigid cage assemblies often had weights exceeding 1,200 pounds. The advantage in lighter weight construction is readily apparent when it is realized that heavier payloads can be transported.

The above described preferred embodiment describes first pivot axis A as extending generally transversely to the longitudinal axis of helicopter 10. Second pivot axis B is described as extending generally parallel to the longitudinal axis. However, it is to be specifically noted that virtually any orientation of frame means 22 would accomplish the same result of freedom in pitch and roll for a load coupled with precise anti-rotation or yaw control.

For instance, considering FIG. 5, it can be envisioned that frame means 22 may be attached to the fuselage so that box beams 50, 52 are located in respective fore and aft positions. Upper assembly 46 would then pivot about an axis extending generally parallel relative to the longitudinal axis of the helicopter for isolating the load during helicopter roll. Lower assembly 48 would then pivot about an axis extending generally transversely to the helicopter's longitudinal axis thus isolating the load during pitch. It can readily be appreciated that precise yaw control would still be provided.

Carrying it a step further, frame means 22 may be connected to the fuselage at any position (as long as it is situated so that spreader bar means 24 extends downwardly through guide means 89) and the result is the same: freedom of the load during pitch and roll, control in yaw.

While the invention has been particularly shown and described with reference to the foregoing preferred embodiment, it will be understood by those skilled in the art that other changes in form and detail may be made therein without departing from the spirit and scope of the invention as defined in the appended claims.

It is claimed and desired to secure by Letters Patent:

1. Apparatus for controlling orientation of a load suspended from the fuselage of a helicopter by a cable comprising:
   spreader bar means connected to the cable for supporting a load connected thereto; and
   frame means mounted on the fuselage for transmitting helicopter yaw movement to said spreader bar means and for simultaneously permitting the load to be suspended substantially isolated from helicopter pitch and roll, said frame means including a first assembly mounted on the fuselage for pivotal movement relative to the fuselage about a first pivot axis including a first pair of strut members pivotally connected adjacent one set of their ends to the fuselage and a second pair of strut members pivotally connected adjacent one set of their ends to the fuselage opposite to said first pair, each pair defining a generally triangular plane which is inclined toward the cable, each strut member of said first pair being connected to a strut member of said second pair, said frame means also including a second assembly connected to said first assembly for pivotal movement about a second pivot axis extending transversely to said first pivot axis, said second assembly also being provided with guide means for receiving said spreader bar means and for transmitting yaw movement of the helicopter thereto.

2. The apparatus of claim 1 wherein said spreader bar means generally occupies a vertical plane, said guide means including laterally opposed members having a predetermined spacing for receiving said spreader bar means therebetween.

3. The apparatus of claim 1 wherein said spreader bar means defines a triangle, the cable being connected adjacent the apex of said triangle and the load suspended from the base of said triangle.

4. The apparatus of claim 1 wherein said second assembly is pivotally connected to said connected strut members.

5. The apparatus of claim 4 wherein said guide means includes a pair of elongate members having portions with a greater spacing than said predetermined spacing.

6. Apparatus for controlling orientation of a load suspended from the fuselage of a helicopter by a cable comprising:
   spreader bar means connected to the cable;
   interconnecting means joining said spreader bar means and the load, said interconnecting means defining two pairs of members which extend downwardly from spaced-apart locations on said spreader bar means to spaced-apart locations on the load; and
   frame means mounted on the fuselage for transmitting helicopter yaw movement to said spreader bar means and for simultaneously permitting the load to be suspended substantially isolated from helicopter pitch and roll, said frame means including a first assembly mounted on the fuselage for pivotal movement relative to the fuselage about a first pivot axis including a first pair of strut members pivotally connected adjacent one set of their ends to the fuselage and a second pair of strut members pivotally connected adjacent one set of their ends to the fuselage opposite to said first pair, each pair defining a generally triangular plane which is inclined toward the cable, each strut member of said first pair being connected to a strut member of said second pair, said frame means also including a second assembly connected to said first assembly for pivotal movement about a second pivot axis extending transversely to said first pivot axis, said second assembly also being provided with guide means for receiving said spreader bar means and for transmitting yaw movement of the helicopter thereto.

7. The apparatus of claim 6 wherein said interconnecting means includes a pair of cables.

* * * * *